US008379102B2

(12) United States Patent
Doida

(10) Patent No.: US 8,379,102 B2
(45) Date of Patent: Feb. 19, 2013

(54) IMAGE PROCESSING APPARATUS AND IMAGE PROCESSING METHOD FOR GENERATING HIGH DYNAMIC RANGE IMAGES

(75) Inventor: Shigeru Doida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 313 days.

(21) Appl. No.: 12/901,062

(22) Filed: Oct. 8, 2010

(65) Prior Publication Data

US 2011/0090372 A1    Apr. 21, 2011

(30) Foreign Application Priority Data

Oct. 20, 2009   (JP) ................................. 2009-241558
Jun. 25, 2010   (JP) ................................. 2010-145052

(51) Int. Cl.
*H04N 5/228*   (2006.01)

(52) U.S. Cl. ................... 348/222.1; 348/229.1; 382/274

(58) Field of Classification Search ........................ None
See application file for complete search history.

(56) References Cited

U.S. PATENT DOCUMENTS

| 5,144,442 | A  | * | 9/1992 | Ginosar et al. ............. 348/222.1 |
| 5,828,793 | A  | * | 10/1998 | Mann ............................ 382/284 |
| 2001/0007473 | A1 | * | 7/2001 | Chuang et al. ................ 348/362 |
| 2005/0013501 | A1 | * | 1/2005 | Kang et al. .................... 382/254 |
| 2008/0187235 | A1 | * | 8/2008 | Wakazono et al. ........... 382/255 |
| 2008/0252750 | A1 | * | 10/2008 | Ogawa ....................... 348/229.1 |

FOREIGN PATENT DOCUMENTS

JP    A-2002-305684    10/2002

* cited by examiner

*Primary Examiner* — Lin Ye
*Assistant Examiner* — Dennis Hogue
(74) *Attorney, Agent, or Firm* — Oliff & Berridge, PLC

(57) ABSTRACT

An image processing synthesizing a plurality of pieces of images photographing an identical scene and having different exposure amounts to generate a high-contrast image expanding a dynamic range and having a wide tonal range, includes a selecting unit selecting a reference image based on information of brightness components of the pieces of images, a gain calculating unit calculating brightness ratios of remaining images among the pieces of images to the reference images excluding the reference image as gains based on the information of the brightness components of the pieces of images, a weight calculating unit calculating weights to be applied to the remaining images based on the gains and information of a brightness component of the reference image, and a generating unit performing weighting synthesis between the reference image and the remaining images by using the weights, to obtain a high-contrast image with fine image quality.

13 Claims, 5 Drawing Sheets

IMAGE PROCESSING APPARATUS AND IMAGE PROCESSING METHOD FOR GENERATING HIGH DYNAMIC RANGE IMAGES

CROSS REFERENCE TO RELATED APPLICATIONS

This application is based upon and claims the benefit of priority from Japanese Patent Application No. 2009-241558 and Japanese Patent Application No. 2010-145052, filed on Oct. 20, 2009 and Jun. 25, 2010, respectively, the entire contents of which are incorporated herein by reference.

BACKGROUND

1. Field

The present application relates to an image processing apparatus and an image processing method.

2. Description of the Related Art

Conventionally, an art to obtain a synthetic image (high-contrast image) of which dynamic range is expanded, with a wide tonal range by synthesizing plural pieces of images photographing an identical scene and of which exposure amounts are different is proposed (for example, Patent Document 1: Japanese Unexamined Patent Application Publication No. 2002-305684).

However, it is impossible according to the conventional art to obtain the high-contrast image with fine image quality when there is a part having a structure of which brightness change is smooth or a pixel having an outstanding value (pixel value) caused by noises or the like is contained in the images to be synthesis targets. Specifically, a tone jump occurs, a noise component remains, or the noise component is emphasized in the high-contrast image after the synthesis.

SUMMARY

A proposition of the present embodiment is to provide an image processing apparatus and an image processing method capable of obtaining a high-contrast image with fine image quality.

An image processing apparatus according to the present embodiment synthesizing a plurality of pieces of images photographing an identical scene and having different exposure amounts to generate a synthetic image (high-contrast image) expanding a dynamic range and having a wide tonal range, the image processing apparatus includes a selecting unit selecting a reference image based on information of brightness components of the pieces of images, a gain calculating unit calculating brightness ratios of remaining images among the pieces of images excluding the reference image to the reference image as gains of the remaining images based on the information of the brightness components of the pieces of images, a weight calculating unit calculating weights to be applied to the remaining images based on the gains being calculated and the information of the brightness component of the reference image, and a generating unit generating the high-contrast image by performing weighting synthesis processing between the reference image and the remaining images by using the weights being calculated.

The selecting unit may select one piece of image having a widest effective range of a brightness distribution as the reference image from among the pieces of images based on information of brightness components of a plurality of reduced images which are a reduced version of the pieces.

The gain calculating unit may calculate the brightness ratios of the remaining images to the reference image as the gains of the remaining images based on information of brightness components of a plurality of reduced images which are a reduced version of the pieces.

The weight calculating unit may assign a larger weight to a part having a higher brightness on an image having a gain value smaller than a predetermined value among the remaining images and a larger weight to a part having a lower brightness on an image having the gain value larger than the predetermined value among the remaining images.

The pieces of images are images having image signal components in a linear characteristic state, and one pieces of image among the pieces of images is photographed under an exposing condition determined by an automatic exposure (AE) or specified by a user, and the remaining images excluding the one piece may be photographed under exposing conditions different from the exposing condition of the one piece.

An image processing method according to the present embodiment synthesizing a plurality of pieces of images photographing an identical scene and having different exposure amounts to generate a synthetic image (high-contrast image) expanding a dynamic range and having a wide tonal range, the image processing method, includes a selecting step selecting a reference image based on information of brightness components of pieces of images, a gain calculating step calculating brightness ratios of remaining images among the pieces of images excluding the reference image to the reference image as gains of the remaining images based on the information of the brightness components of the pieces of images, a weight calculating step calculating weights to be applied to the remaining images based on the gains being calculated and information of a brightness component of the reference image, and a generating step generating the high-contrast image by performing weighting synthesis processing between the reference image and the remaining images by using the weights being calculated.

The selecting step may select one piece of image having a widest effective range of a brightness distribution as the reference image from among the pieces of images based on information of brightness components of a plurality of reduced images which are a reduced version of the pieces of images.

The gain calculating step may calculate the brightness ratios of the remaining images to the reference image as the gains of the remaining images based on information of brightness components of a plurality of reduced images which are a reduced version of the pieces of images.

The weight calculating step may assign a larger weight to a part having a higher brightness on an image having a gain value smaller than a predetermined value among the remaining images and a larger weight to a part having a lower brightness on an image having the gain value larger than the predetermined value among the remaining images.

DETAILED DESCRIPTION OF THE EMBODIMENT

Hereinafter, embodiments are described.

Figure 1:
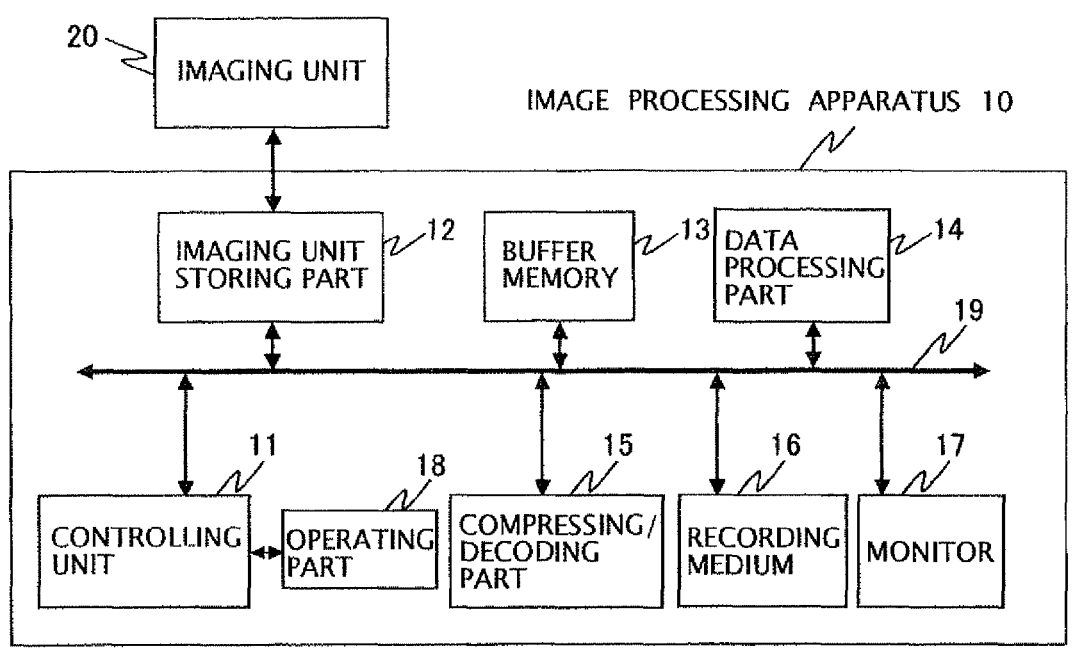
FIG. 1 is a block diagram illustrating a configuration of an image processing apparatus of an embodiment.

FIG. 1 is a block diagram illustrating a configuration of an image processing apparatus of the present embodiment. As illustrated in FIG. 1, the image processing apparatus of the present embodiment is made up of an image processing apparatus 10 and an imaging unit 20 coupled thereto.

The image processing apparatus 10 includes a controlling unit 11, an imaging unit storing part 12, a buffer memory 13, a data processing part 14, a compressing/decoding part 15, a recording medium 16, a monitor 17, an operating part 18, and a system bus 19. Here, the controlling unit 11, the imaging unit storing part 12, the buffer memory 13, the data processing part 14, the compressing/decoding part 15, the recording medium 16, and the monitor 17 are coupled via the system bus 19. Besides, the operating part 18 is coupled to the controlling unit 11.

The imaging unit 20 is coupled to the image processing apparatus 10 via a storing port (not-illustrated) of the imaging unit storing part 12. Note that this coupling is performed by using a communication cable based on a standard such as IEEE1394 or USB.

The imaging unit 20 is made up of an imaging sensor having an imaging area forming a number of light-receiving elements (pixels) arranged in a two-dimensional matrix state on a semiconductor substrate, a signal processing circuit performing signal processing such as clamp processing, a sensitivity adjustment (gain adjustment), an A/D conversion for an image signal output from the imaging sensor and outputs an image data after the signal processing to the image processing apparatus 10 and so on. Note that the imaging sensor of the imaging unit 20 is made up of an imaging sensor of, for example, a CCD type or a CMOS type.

Besides, the imaging unit 20 includes a shooting lens made up of plural lens groups including a focus lens, a zoom lens, and a lens driving part performing a focusing adjustment and a zooming adjustment by moving the shooting lens in an optical axis direction. Note that the focusing adjustment and the zooming adjustment of the shooting lens are performed in accordance with an instruction from the controlling unit 11 of the image processing apparatus 10.

The imaging unit 20 photographs an image of a subject image captured on the imaging area based on the instruction from the controlling unit 11 of the image processing apparatus 10. The imaging unit 20 performs controlling of AE (automatic exposure) and AF (automatic focusing) at the photographing time based on the instruction from the controlling unit 11 of the image processing apparatus 10. Otherwise, the controlling is performed by the imaging unit 20 and the controlling unit 11 of the image processing apparatus 10 by collaboration. An image data output from the imaging unit 20 by the photographing is output to the buffer memory 13 of the image processing apparatus 10 via the imaging unit storing part 12.

The image data output from the imaging unit 20 is temporary recorded at the buffer memory 13. Besides, image data and so on created at the process of the processing by the controlling unit 11 are also temporary recorded at the buffer memory 13.

The data processing part 14 performs image processing such as a defective pixel correction, a shading correction, a white balance adjustment, an interpolation, an edge enhancement, a gamma correction for the image data recorded at the buffer memory 13 in accordance with the instruction of the controlling unit 11. Note that the data processing part 14 is made up as an ASIC and so on.

The compressing/decoding part 15 performs a compression processing for the image data of the buffer memory 13 in accordance with the instruction of the controlling unit 11. Note that the compression processing is performed by jPEG (joint Photographic Experts Group) format and so on.

The recording medium 16 is made up of a memory card, a hard disk, an optical disk (DVD or the like) and so on. The recording medium 16 may be the one housed in the image processing apparatus 10, the one detachably attached, or the one provided externally. When the recording medium 16 is provided externally, the recording medium 16 and the image processing apparatus 10 are electrically coupled by wire or wireless.

The monitor 17 is a display device made up of an LCD display, a CRT display and so on. Note that the monitor 17 may be the one housed in the image processing apparatus 10 or the one provided externally. When the monitor 17 is provided externally, the monitor 17 and the image processing apparatus 10 are electrically coupled by wire.

The monitor 17 displays contents of an image before the image processing, displays contents of the image after the image processing as an image processing result, further displays an image processing menu screen (GUI) enabling a user to instruct the contents of the image processing performed for the image, and so on in accordance with the instruction of the controlling part 11.

The operating part 18 includes various kinds of input devices so that the user performs the instruction for the controlling unit 11 such as a keyboard or pointing devices such as a mouse, a track pad, and so on. The user is able to perform the instruction of the contents of the image processing performed for the image, the instruction to execute the image processing, and so on for the controlling unit 11 by operating these input devices.

Incidentally, the image processing apparatus of the present embodiment includes a function (high-contrast imaging function) creating the high-contrast image by synthesizing plural pieces of images photographing an identical scene and having different exposure amounts.

Figure 2:
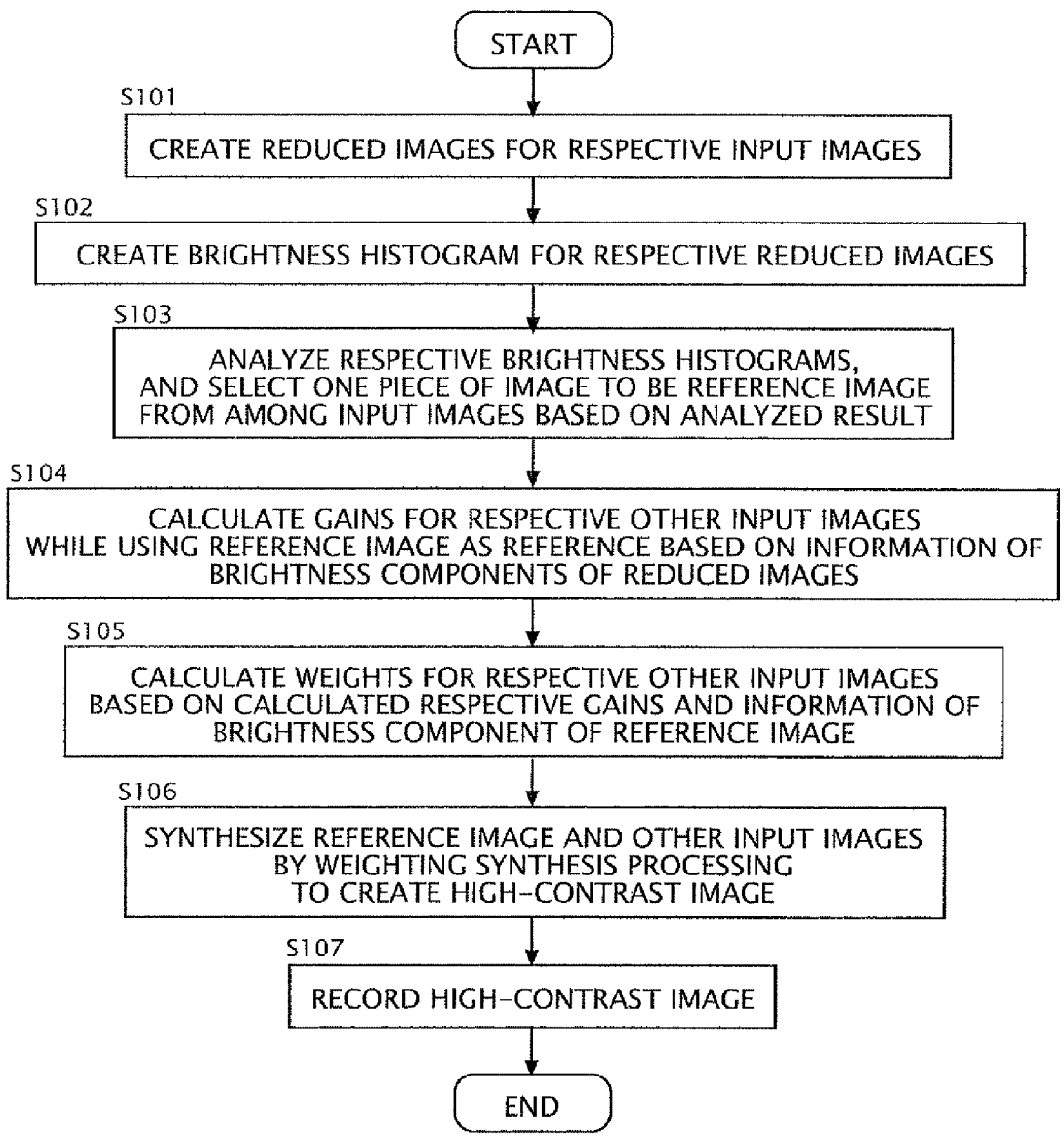
FIG. 2 is a flowchart illustrating operations of an image processing apparatus relating to a high-contrast image creation.

Hereinafter, operations performed by the image processing apparatus of the present embodiment as for this function are described with reference to a flowchart in FIG. 2. The processing of the flowchart in FIG. 2 is the one called when the execution of the high-contrast imaging function is instructed when the plural pieces of images photographing the identical scene and having different exposure amounts output from the imaging unit 20 are recorded at the buffer memory 13 by specifying the plural pieces of images in the buffer memory 13 as input images (1 to N).

Note that the specification of the input images and the execution instruction of the corresponding function can be performed, for example, by the user by selecting and confirming an item of "create a high-contrast image" from the image processing menu screen (GUI) displayed on the monitor 17 by operating the input devices of the operating part 18.

The plural pieces of images photographing the identical scene and having different exposure amounts as stated above can be obtained by performing, for example, an exposure bracketing shooting. In this case, the exposure bracketing shooting may be performed so that one of these plural pieces of images is photographed under an exposing condition determined by AE (automatic exposure) or an exposing condition specified by the user, and the other remaining images are photographed under a different exposing condition (a reference exposing condition±n steps) while using the above-stated exposing condition as the reference.

Step 101 (S101): The controlling unit 11 creates reduced images as for respective specified input images (1 to N). For example, the reduced image is created by taking an average of pixel values of 2×2 pixels or 4×4 pixels in a spatial direction of each input image or the like. Note that the created reduced images (1 to n) are recorded at a different area from the input images (1 to N) of the buffer memory 13.

Step 102: The controlling unit 11 creates a histogram of brightness component (brightness histogram) as for each of the created reduced images (1 to n).

Step 103: The controlling unit 11 analyzes respective created brightness histograms, and selects one piece to be a reference image from among the input images (1 to N) based on the analyzed result.

Specifically, at first, the number of pixels (i) being, for example, 0.1% of the number of all pixels of the reduced image to be the base for the creation of the brightness histogram is asked. Note that a rate (0.1% and so on) relative to the number of all pixels iof the reduced image s specified so that a defective pixel of the imaging sensor, or pixels at an area other than the pixels making up the image such as an outstanding pixel value or a noise are not included in a calculation object.

Figure 3:
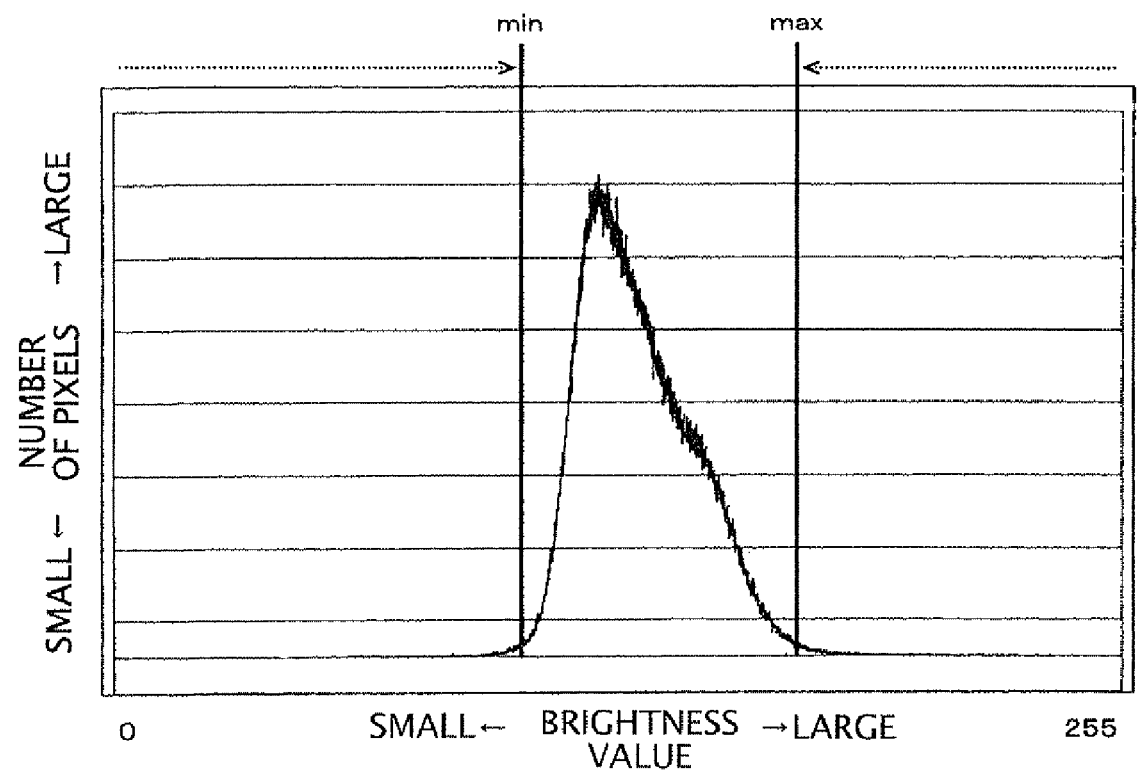
FIG. 3 is a view illustrating an example of a brightness histogram of a reduced image.

Next, the brightness histogram is searched from a high brightness side (brightness value: "255") of a horizontal axis (brightness) toward a low brightness side (brightness value: "0" (zero)) up to a point where a value of a vertical axis (the number of pixels) of the brightness histogram matches with the number of pixels (i) asked in advance by using the created brightness histogram, for example, here, when an example of the brightness histogram in FIG. 3 is used. The matched value (brightness value) of the horizontal axis is extracted as a "max (brightness maximum value)". Subsequently, the brightness histogram is searched from the low brightness side (brightness value: "0" (zero)) of the horizontal axis (brightness) of the same brightness histogram toward the high brightness side (brightness value: "255") up to the point where the value of the vertical axis (the number of pixels) of the brightness histogram matches with the number of pixels (i) asked in advance, and the matched value of the horizontal axis (brightness value) is extracted as a "min (brightness minimum value)".

The input image (one piece) corresponding to the reduced image being the creation basis of the brightness histogram of which difference between the "max (brightness maximum value)" and the "min (brightness minimum value)" is the maximum is selected as the reference image.

The one piece of image of which effective range of a brightness distribution is the widest is selected as the reference image from among the input images (1 to N).

Step 104: The controlling unit 11 calculates a gain of each of the other input images (the remaining one or more pieces of input images excluding the reference image) which refers to the reference image based on information of the brightness component of the reduced images. Specifically, the gain is calculated by the following expression (1). Here, "$f_Y(x, y)$" in the expression (1) represents the brightness component of the reduced image of the reference image, "$h_Y(x, y)$" represents the brightness component of the reduced image of the other input image being a comparison object, and "(x, y)" represents a coordinate position of each pixel in the reduced image. Incidentally, the gain calculation is not necessary when the bracket shooting in which the photographing is performed under an exposing condition specified in advance is performed.

$$\text{gain} = \frac{\sum [f_Y(x, y) h_Y(x, y)]}{\sum [f_Y(x, y)]^2} \quad (1)$$

Note that "the other input image" being the calculation object is an image which is photographed under the exposing condition of underexposure relative to the reference image when the value of the gain calculated by the expression (1) becomes smaller than 1.0 (gain<1.0). Besides, "the other input image" being the calculation object is an image which is photographed under the exposing condition of overexposure relative to the reference image when the value of the calculated gain becomes larger than 1.0 (gain>1.0).

Step 105: The controlling unit 11 calculates weights for each of the respective other input images based on the respective calculated gains and information of the brightness component of the reference image. Specifically, the weight (W) in accordance with the value of the gain is calculated by the following expression (2). Here, "$f_Y(x, y)$" of the expression (2) represents the brightness component of the reference image. The "min" and the "max" are the "min (brightness minimum value)" and the "max (brightness maximum value)" asked from the brightness histogram corresponding to the reference image when the reference image is selected at the step 103. The weights are calculated by the expression (2) for the respective other input images while using the brightness of the reference image as the reference.

$$\begin{cases} W = -2\log_2(\text{gain}) \times \{(f_Y(x, y) - \min)/\text{range}\} & \text{(for gain < 1.0)} \\ W = 1.0 & \text{(for gain = 1.0)} \\ W = -2\log_2(\text{gain}) \times \{f_Y(x, y) - \min/\text{range} - 1\} & \text{(for gain > 1.0)} \\ \text{range} = \max - \min \end{cases} \quad (2)$$

Note that, according to the expression (2), the larger weight is assigned to a part having the higher brightness on "the other input image" photographed under the exposing condition of underexposure relative to the reference image by the calculation of "for gain<1.0", (incidentally, the "W" is set at "0" (zero) when the "$f_Y$<min" regardless of the expression (2), and the "W" is set at "−2 log$_2$ (gain)" when the "$f_Y$>max" regardless of the expression (2)). This is because information of the high brightness part of "the other input image" photographed under the low exposure amount is finer than information of the high brightness part of the reference image.

Besides, the larger weight is assigned to a part having the lower brightness on "the other input image" photographed under the exposing condition of overexposure relative to the reference image by the calculation of "for gain>1.0", (incidentally, the "W" is set at (2 log$_2$(gain)) when the "$f_Y$<min" regardless of the expression (2), and the "W" is set at "0" (zero) when the "$f_Y$>max" regardless of the expression (2)). This is because information of the low brightness part of "the other input image" photographed under the high exposure amount is finer than information of the low brightness part of the reference image.

Step 106: The controlling unit 11 synthesizes the reference image and the other input images by weighting synthesis processing of the following expression (3) to create a high-contrast image.

Specifically, the high-contrast image is created by performing a weighting synthesis between the reference image and the other input images with the calculated weight by each of the color components of R (r), G (g), B (b). Note that "$g_c(x, y)$" of the expression (3) represents the high-contrast image to be created, "$f_c(x, y)$" represents the "reference image", and "$h_{1c}(x, y)$ to $h_{n-1c}(x, y)$" represent the other input images (1 to N−1, namely, remaining one or more pieces of input ages excluding the reference image). "$W_1$ to $W_{n-1}$" represent the weights calculated at the step 105 relative to the respective other input images (1 to N−1), "1.0" represents the weight relative to the reference image, "n" represents the number of pieces (N) of the input images, and "c" represents each of the color components of R (r), G (g), B (b).

$$g_c(x, y) = \qquad (3)$$
$$\{f_c(x, y) + W_1 h_{1c}(x, y) \sim W_{n-1} h_{n-1c}(x, y)\} / (1.0 + W_1 \sim W_{n-1})$$
$$\boxed{c = \{r, g, b\}}$$

As stated above, the weight is calculated based on only the brightness component (step 105), and the weighting synthesis processing is performed by applying the weights for all of the color components of R (r), G (g), B (b) of the input images (step 106). Accordingly, color balances of the individual input images are maintained as they are to be surely reflected on the created high-contrast image.

Besides, the high-contrast image is generated as for individual color components of R (r), G (g), B (b) of the input image in addition to the above. Specifically, it becomes possible to effectively express a tonal range if the all of above-stated portions processed by the brightness components are replaced by processing by each color component.

Step 107: The controlling unit 11 records the created high-contrast image at the recording medium 16. Note that it is preferable that the high-contrast image is recorded as a non-compression state. The controlling unit 11 terminates the processing of the present flowchart.

Figure 4:
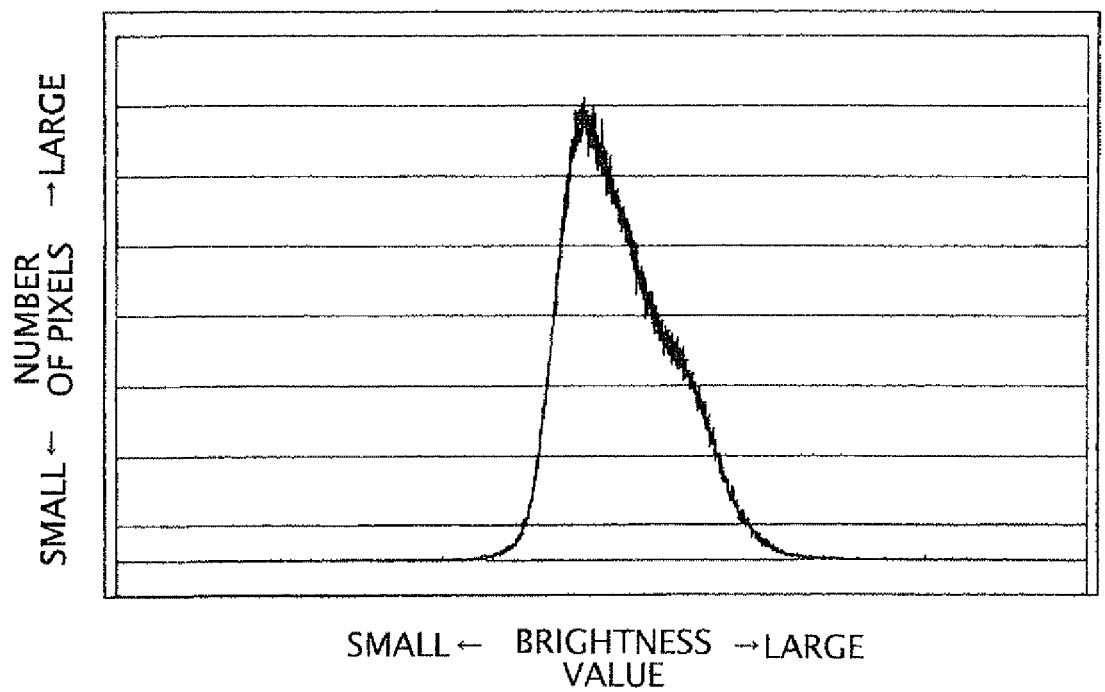
FIG. 4 is a view illustrating an example of a brightness histogram of an image photographing a subject of which contrast is low.

Note that the above-stated processing particularly has an effect when a subject of which contrast is low (contrast is not clear) as illustrated in the brightness histogram in FIG. 4 is photographed and a high-contrast image is created. In this case, the exposure bracketing shooting is performed while setting exposure steps to be a small step such as, for example, ⅓ step, and plural pieces of images photographing the identical scene and having different exposure amounts obtained by the above are specified as the input images, and the above-stated processing is to be performed.

(Supplementary Description of Embodiment)

Note that it is necessary that a gamma correction (gamma conversion) or the like is not performed for the above-stated input images used for the creation of the above-stated high-contrast image. Namely, it is necessary that image signal components making up the input images are in a linear characteristic state output from an imaging sensor. Accordingly, when the input image to which the image processing such as the gamma correction (gamma conversion) is performed is used, the processing from the step 101 is to be performed after an inverse gamma correction (inverse gamma conversion) is once performed for the input image to return the image signal component of the input image to the linear characteristic state.

Besides, the contents of the high-contrast image may be displayed on the monitor 17 in addition to record the created high-contrast image to the recording medium 16 at the step 107.

Figure 5:
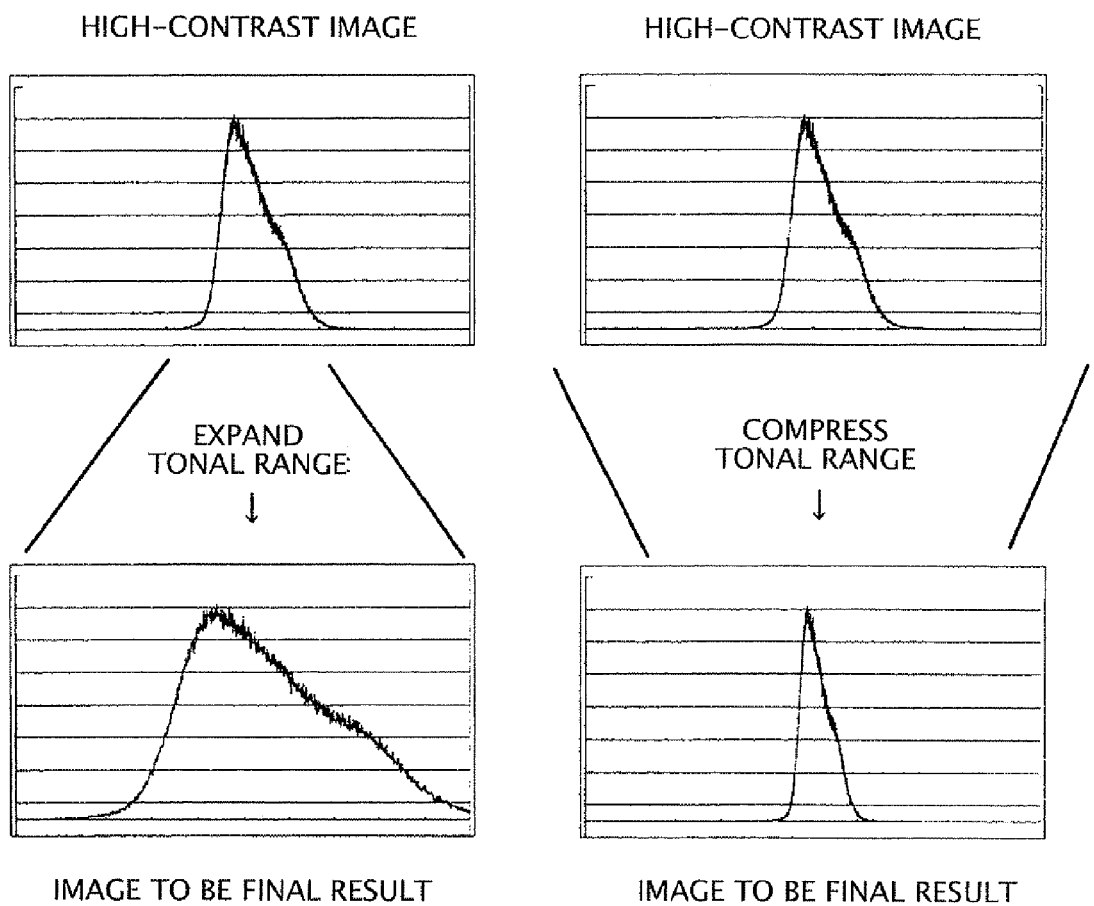
FIG. 5 is a view illustrating an example creating an image to be a final result based on a high-contrast image.

It is also conceivable to enable the user to create the image with an arbitrary tonal range to be a final result based on the high-contrast image. In this case, the tonal range after an expansion or a compression is specified by the user, then for example, tone transformation is performed with the specified contents based on the high-contrast image as illustrated in FIG. 5, to create the image to be the final result. Note that the tone transformation in this case can be the tone transformations in existing methods such as, for example, a tone transformation using an LUT (Look Up Table) for the tone transformation, and a tone transformation using a transformation expression by a histogram equalization method (HE).

The created final result image may be recorded at the recording medium 16 after it is compressed by the compressing/decoding part 15. Besides, the contents of the final result image may be displayed on the monitor 17.

(Operation and Effect of Embodiment)

The reduced images are created as for the respective input images (1 to N) in the image processing apparatus of the present embodiment. The reduced image is created by, for example, taking an average of pixel values of n×n (n≧2) pixels in a spatial direction of each input image.

Next, one piece of image of which effective range of the brightness distribution is the widest is selected as the reference image from among the input images based on the result analyzing the brightness histograms of the respective reduced images.

The brightness ratios of the other input images (the remaining one or more pieces of the input images excluding the reference image) to the reference image are calculated as gains of the other input images based on the information of the brightness components of the reduced images.

The weights applied for the respective other input images are calculated based on the calculated respective gains and the information of the brightness component of the reference image are calculated, then the weighting synthesis processing is performed between the reference image and the other input images by using the weights, and the high-contrast image being the result of the synthesis is created.

The selection of the reference image, the calculation of the gains, the calculation of the weights are performed based on the information of the "reduced images" which are a reduced version of the input images (1 to N), in the image processing apparatus of the present embodiment.

Accordingly, a noise component is reduced in the high-contrast image created by the weighting synthesis processing even when the pixel in which the noise is generated is contained in the input images to be the synthesis target. Besides, the tone jump is difficult to be generated in the high-contrast image created by the weighting synthesis processing even when a pixel having an outstanding pixel value is contained in the input image.

The calculation of the weight is performed so that the larger weight is assigned to a part having the higher brightness on the other input image having the small gain (the brightness ratio to the reference image) (gain<1.0), namely, the other input image photographed under the exposing condition of underexposure relative to the reference image, in the image processing apparatus of the present embodiment. This is because the information of the high brightness part is fine in the other input image photographed in underexposure so that the exposure amount becomes smaller than the reference image. Besides, the calculation of the weight is performed so that the larger weight is assigned to a part having the lower brightness on the other input image having the large gain (gain>1.0), namely, the other input image photographed under the exposing condition of overexposure relative to the reference image. This is because the information of the low brightness part is fine in the other input image photographed in overexposure so that the exposure amount becomes larger than the reference image.

Accordingly, the tone jump is difficult to occur in the high-contrast image created by the weighting synthesis processing even when the portion having a structure of which brightness change is smooth is contained in the input images to be the synthesis target.

One piece of image of which effective range of the brightness distribution is the widest is selected as the reference image among the input images (1 to N), and the gain calculation and the weight calculation are performed based on the reference image, in the image processing apparatus of the present embodiment. The high-contrast image is created by performing the weighting synthesis processing between the reference image and the other input images by using the calculated weights.

As stated above, the above-stated synthesis processing is performed based on the reference image of which effective range of the brightness distribution is the widest in the image processing apparatus of the present embodiment, and therefore, the noise and the tone jump generated at the high-contrast image resulting from the synthesis can be reduced than a conventional method.

Consequently, according to the image processing apparatus of the present embodiment, the high-contrast image with fine image quality can be obtained.

(Other)

The present embodiment can be applied to other equipments capable of performing the exposure bracketing shooting, for example, such as a digital camera (digital still camera), a digital video camera and a cellular phone. Further, the present embodiment can be applied to a microscope and so on capable of performing observation of a subject by using an image obtained by an imaging sensor.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. An image processing apparatus synthesizing a plurality of pieces of images photographing an identical scene and having different exposure amounts to generate a synthetic image expanding a dynamic range and having a wide tonal range, the synthetic image being a high-contrast image, the image processing apparatus comprising:

a selecting unit selecting a reference image based on information of brightness components of the pieces of images;

a gain calculating unit calculating brightness ratios of remaining images to the reference image as gains of the remaining images based on the information of the brightness components of the pieces of images, the remaining images being images among the pieces of images excluding the reference image;

a weight calculating unit calculating weights to be applied to the remaining images based on the gains being calculated and information of a brightness component of the reference image; and a generating unit generating the high-contrast image by performing weighting synthesis processing between the reference image and the remaining images by using the weights being calculated.

2. The image processing apparatus according to claim 1, wherein the selecting unit selects one piece of image having a widest effective range of a brightness distribution as the reference image from among the pieces of images based on information of brightness components of a plurality of reduced images which are a reduced version of the pieces of images.

3. The image processing apparatus according to claim 2, wherein the weight calculating unit:

assigns a larger weight to a part having a higher brightness on an image having a gain value smaller than a predetermined value among the remaining images; and assigns a larger weight to a part having a lower brightness on an image having the gain value larger than the predetermined value among the remaining images.

4. The image processing apparatus according to claim 1, wherein the gain calculating unit calculates the brightness ratios of the remaining images to the reference image as the gains of the remaining images based on information of brightness components of a plurality of reduced images which are a reduced version of the pieces of images.

5. The image processing apparatus according to claim 4, wherein the weight calculating unit:

assigns a larger weight to a part having a higher brightness on an image having a gain value smaller than a predetermined value among the remaining images; and assigns a larger weight to a part having a lower brightness on an image having the gain value larger than the predetermined value among the remaining images.

6. The image processing apparatus according to claim 1, wherein the weight calculating unit:

assigns a larger weight to a part having a higher brightness on an image having a gain value smaller than a predetermined value among the remaining images; and assigns a larger weight to a part having a lower brightness on an image having the gain value larger than the predetermined value among the remaining images.

7. The image processing apparatus according to claim 1, wherein:

the pieces of images are images having image signal components in a linear characteristic state; and one piece of image among the pieces of images is photographed under an exposing condition determined by an automatic exposure (AE) or specified by a user, and the remaining images excluding the one piece are photographed under exposing conditions different from the exposing condition of the one piece.

8. An image processing method synthesizing a plurality of pieces of images photographing an identical scene and having different exposure amounts to generate a synthetic image expanding a dynamic range and having a wide tonal range, the synthetic image being a high-contrast image, the image processing method, comprising:

a selecting step selecting a reference image based on information of brightness components of pieces of images;

a gain calculating step calculating brightness ratios of remaining images to the reference image as gains of the remaining images based on the information of the brightness components of the pieces of images, the remaining images being images among the pieces of images excluding the reference image;

a weight calculating step calculating weights to be applied to the remaining images based on the gains being calculated and information of a brightness component of the reference image; and a generating step generating the high-contrast image by performing weighting synthesis processing between the reference image and the remaining images by using the weights being calculated.

9. The image processing method according to claim 8, wherein the selecting step selects one piece of image having a widest effective range of a brightness distribution as the reference image from among the pieces of images based on information of brightness components of a plurality of reduced images which are a reduced version of the pieces of images.

10. The image processing method according to claim 9, wherein the weight calculating step:

assigns a larger weight to a part having a higher brightness on an image having a gain value smaller than a predetermined value among the remaining images; and assigns a larger weight to a part having a lower brightness on an image having the gain value larger than the predetermined value among the remaining images.

11. The image processing method according to claim 8, wherein the gain calculating step calculates the brightness ratios of the remaining images to the reference image as the gains of the remaining images based on information of brightness components of a plurality of reduced images which are a reduced version of the pieces of images.

12. The image processing method according to claim 11, wherein the weight calculating step:

assigns a larger weight to a part having a higher brightness on an image having a gain value smaller than a predetermined value among the remaining images; and assigns a larger weight to a part having a lower brightness on an image having the gain value larger than the predetermined value among the remaining images.

13. The image processing method according to claim 8, wherein the weight calculating step:

assigns a larger weight to a part having a higher brightness on an image having a gain value smaller than a predetermined value among the remaining images; and assigns a larger weight to a part having a lower brightness on an image having the gain value larger than the predetermined value among the remaining images.

* * * * *